US012618866B2

(12) United States Patent
Sabater

(10) Patent No.: US 12,618,866 B2
(45) Date of Patent: May 5, 2026

(54) TIME-SWITCHED FREQUENCY MODULATED ACCELEROMETER LONG-TERM STABILIZATION

(71) Applicant: Naval Information Warfare Center Pacific, San Diego, CA (US)

(72) Inventor: Andrew B Sabater, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 434 days.

(21) Appl. No.: 18/342,837

(22) Filed: Jun. 28, 2023

(65) Prior Publication Data

US 2025/0004006 A1     Jan. 2, 2025

(51) Int. Cl.
G01P 15/08          (2006.01)

(52) U.S. Cl.
CPC ..................................... G01P 15/08 (2013.01)

(58) Field of Classification Search
None
See application file for complete search history.

(56) References Cited

U.S. PATENT DOCUMENTS

| | | | | |
|---|---|---|---|---|
| 6,742,389 | B2 * | 6/2004 | Nguyen | ............. G01P 15/0802 |
| | | | | 73/504.12 |
| 6,843,127 | B1 * | 1/2005 | Chiou | ................ G01C 19/5719 |
| | | | | 73/504.12 |
| 8,322,213 | B2 * | 12/2012 | Trusov | ............... G01C 19/5719 |
| | | | | 73/504.12 |
| 2014/0208823 | A1 * | 7/2014 | Trusov | ................. G01P 15/125 |
| | | | | 73/1.38 |
| 2018/0031601 | A1 * | 2/2018 | Anac | .................. G01C 19/5726 |

OTHER PUBLICATIONS

Unpublished patent application with U.S. Appl. No. 17/950,206 with inventor Andrew B. Sabater.
Unpublished patent application with U.S. Appl. No. 18/063,124 with inventor Andrew B. Sabater.

* cited by examiner

*Primary Examiner* — Alvaro E Fortich
*Assistant Examiner* — Carl F.R. Tchatchouang
(74) *Attorney, Agent, or Firm* — Naval Information Warfare Center Pacific; Kyle Eppele

(57) ABSTRACT

A method for improving long-term stability in a time-switched frequency modulated accelerometer includes demodulating a frequency of the time-switched frequency modulated accelerometer in an anti-phase vibrational mode one or more instances. Assuming an initial phase offset value, demodulating occurs in-phase and out-of-phase with a modulation reference to extract the in-phase and out-of-phase responses. The method further includes calculating a slope between the in-phase and the out-of-phase responses where if the slope is not equal to 1 or –1, the phase offset value is adjusted, and the demodulating is repeated until the slope is equal to 1 or –1. If the slope is equal to 1 or –1, the selected phase offset value is kept as a selected phase offset value. The method further includes using a linear model to detect bias drift with the out-of-phase response, thereby compensating for bias drift in the in-phase response.

13 Claims, 7 Drawing Sheets

TIME-SWITCHED FREQUENCY MODULATED ACCELEROMETER LONG-TERM STABILIZATION

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. Licensing and technical inquiries may be directed to the Office of Research and Technical Applications, Naval Information Warfare Center Pacific, Code 72120, San Diego, CA, 92152; (619) 553-5118; NIWC_Pacific_T2@us.navy.mil. Reference Navy Case Number 211116.

BACKGROUND

Inertial navigation provides a means to navigate independent of global positioning satellites (GPS) and is immune to certain issues related to the use of GPS. Inertial navigation is based on fusing measurements from accelerometers and gyroscopes to estimate position, velocity, and attitude. In order to extract the actual acceleration of a vehicle while moving, a model for local gravity is needed to compensate the output of the accelerometers. The position estimate provided by inertial navigation can be degraded for a variety of factors internal and external to these sensors. Internal factors include Gaussian noise processes associated with electronics of the sensors and a slow drift due to temperature variations or packaging material aging. External factors include initialization errors (an error in the initial estimate for position, velocity or attitude) or deflection of vertical (DOV) errors associated with modeling errors for local gravity. However, position drift due to bias changes can be mitigated by creating stable accelerometers.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Figure 1:
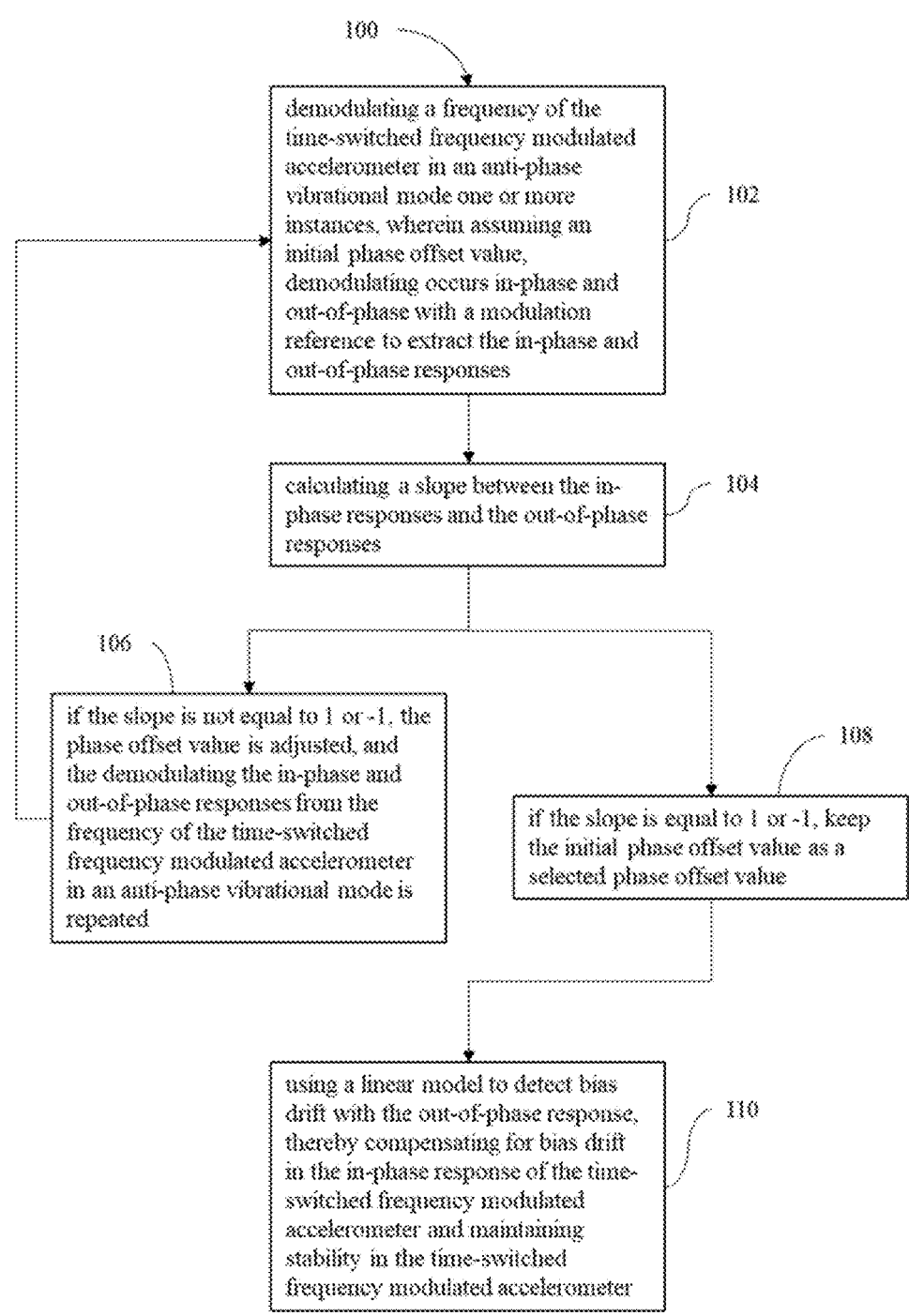
FIG. 1 is an example of a flow diagram of a method for improving long-term stability in a frequency modulated accelerometer.

The current approach for selecting the phase offset when using frequency-modulated accelerometers is to maximize the in-phase scale factor, which, in turn, improves sensitivity of the time-switched frequency modulated accelerometer. This approach is justified based on the assumption that the out-of-phase response provides no useful information after the phase offset is tuned to maximize in-phase scale factor as these responses should be orthogonal. However, as discussed in the method herein, this is not correct. The in-phase channel and out-of-phase channel can be used to observe bias drift over time in a time-switched frequency modulated accelerometer.

In the method herein, the magnitude of the correlation coefficient is nearly one for most values of the phase offset. A rapid phase value transition to zero occurs where the slope is about zero. This demonstrates that, in general, the in-phase and out-of-phase channels are correlated. As such, the correlated signal can be used to observe bias drift. A linear model can then be implemented to improve long-term stability of time-switched frequency-modulated accelerometers. The advantages of this model are it is simple enough for real-time operation and reduces turn-on and off bias drift.

To initialize a time-switched frequency modulated accelerometer, a positive-feedback loop to sustain the oscillations of the anti-phase vibrational mode of the time-switched frequency modulated accelerometer at a constant amplitude is implemented. Then, with a pair of tuning electrodes that are aligned to the in-phase mode, voltages equal in magnitude but opposite in phase are applied. These tuning electrodes are aligned to the in-phase mode such that for a given voltage, these electrodes will give rise to an equal in magnitude, but opposite in phase, change in the frequency of the anti-phase vibrational mode. In operation, periodic signals such as sine or square waves can be applied to the tuning electrodes and give rise to a frequency modulation effect at the frequency of the periodic signal. These periodic signals can be provided by a variety of devices such a waveform generator, but often an amplifier is needed to boost the signal from such devices. Ideally, the component of the frequency modulated signal that is in-phase with the periodic signal provides a means to estimate acceleration and the out-of-phase response is ignored as it is typically has a low output and skilled artisans assume the out-of-phase response is not be related to acceleration. In practice, due to delays with amplifiers used to generate the periodic signals or the signal processing, an additional delay is added to the signal processing to compensate for this effect. Moreover, the out-of-phase response provides a means to observe bias drift in the in-phase response that is independent of the acceleration input.

The method herein for improving long-term stability in a time-switched frequency modulated accelerometer includes demodulating a frequency of the time-switched frequency modulated accelerometer in an anti-phase vibrational mode one or more instances. Assuming an initial phase offset value, demodulating occurs in-phase and out-of-phase with a modulation reference to extract the in-phase and out-ofphase responses. A slope between the in-phase responses and the out-of-phase responses is calculated. One of the following occurs, if the slope is not equal to 1 or −1, the phase offset value is adjusted, and the demodulating the in-phase and out-of-phase responses from the frequency of the time-switched frequency modulated accelerometer in an anti-phase vibrational mode is repeated until the slope is equal to 1 or −1 or if the slope is equal to 1 or −1, the selected phase offset value is kept as a selected phase offset value. A linear model is used to detect bias drift with the out-of-phase response, thereby compensating for bias drift in the in-phase response of the time-switched frequency modulated accelerometer and the stability of the time-switched frequency modulated accelerometer is maintained.

Referring now to FIG. 1, the method 100 includes 102 demodulating a frequency of the time-switched frequency modulated accelerometer in an anti-phase vibrational mode one or more instances. The initial phase offset value is assumed and the demodulating occurs in-phase and out-of-phase with a modulation reference to extract the in-phase and out-of-phase responses. A computer processor, an application-specific integrated circuit, a field programmable gate array, or a microcontroller may be used to demodulate the frequency of the time-switched frequency modulated accelerometer. The phase offset value is a value between 0° and 360° or 0 and 2 pi radians. The phase offset value is added to the signal of the time-switched frequency modulated accelerometer to compensate for delays from amplifiers used to generate the periodic voltages or in-signal processing that reduce sensitivity and stability of the in-phase response. The phase offset value is adjusted to maximize stability. The modulation reference may be a device that produces periodic voltage signals, such as a waveform generator. In 102, an initial phase offset value is assumed to obtain the in-phase and out-of-phase responses based on estimated delays in the system. 102 is repeated one or more instances to extract different outputs of the time-switched frequency modulated accelerometer during operation and gather additional data.

Figure 2:
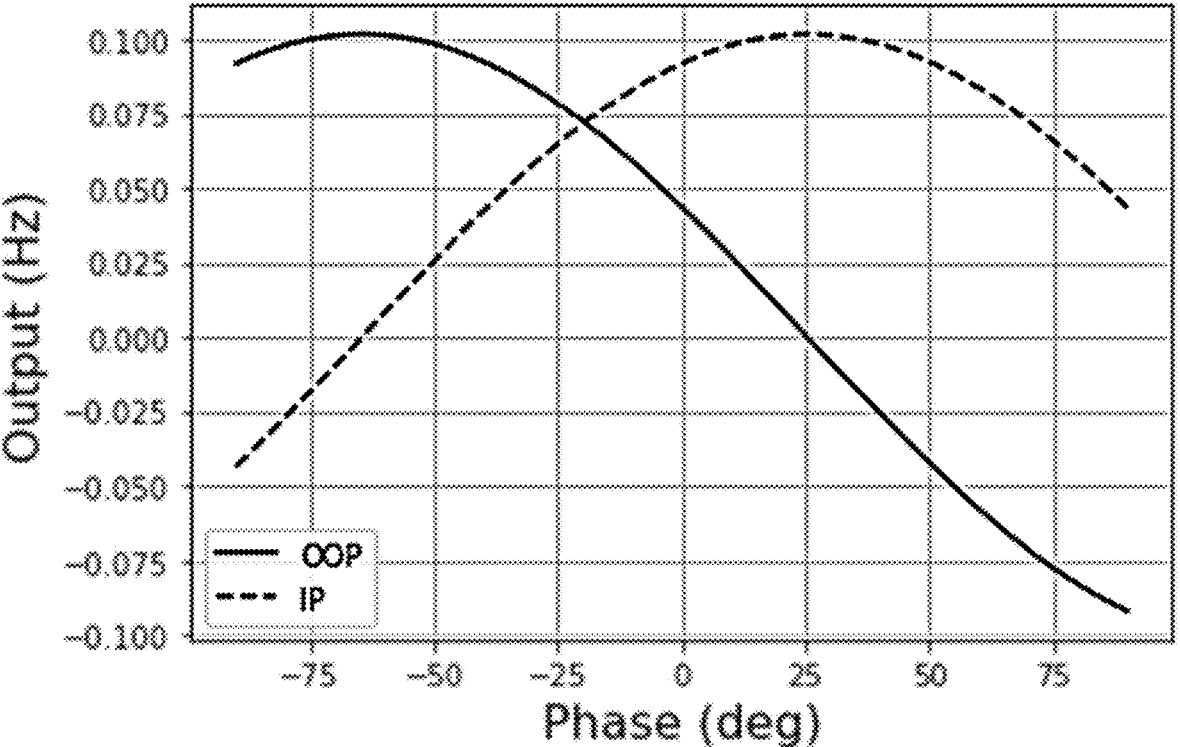
FIG. 2 is an example of a graph showing the uncalibrated Output (Hz) (Y-axis) vs. Phase (deg) (X-axis) of the mean value of the in-phase and out-of-phase channels when setup to measure −1 g for different phase offset values.

Referring to FIG. 2, in some examples, the mean value is calculated using the in-phase and out-of-phase response data. In addition, a computer processor, an application-specific integrated circuit, a field programmable gate array, or a microcontroller may be calculate the mean value data of the in-phase and out-of-phase responses. FIG. 2 shows an example of mean value data extracted from in-phase and out-of-phase responses with a time-switched frequency modulated accelerometer setup to measure −1 g for different phase offset values. FIG. 2 demonstrates the extremum of the in-phase response corresponds to a zero of the out-of-phase response. In examples where the mean value is calculated, the mean value is used to determine sensitivity of the in-phase and out-of-phase responses to acceleration. The mean value can also be used to validate the extremum of the in-phase response corresponds to a zero of the out-of-phase response.

Referring back to FIG. 1, the method 100 includes 104 calculating a slope between the in-phase responses and the out-of-phase responses. The slope m and correlation coefficient r is calculated using equation (I):

$$m = \frac{\sum_{i=1}^{n} (IP_i - \overline{IP})(OOP_i - \overline{OOP})}{\sum_{i=1}^{n} (OOP_i - \overline{OOP})^2} \tag{I}$$

where n is the total number of measurements of the in-phase and out-of-phase response, $IP_i$ and $OOP_i$ are the i-th measurements of the in-phase and out-of-phase response, $\overline{IP}$ and $\overline{OOP}$ are the mean values of the in-phase and out-of-phase response. The slope is used to determine the phase offset value when the slope is equal to 1 or −1.

In FIG. 1, the method 100 includes either 106 or 108. After calculating the slope in 104, in 106, if the slope is not equal to 1 or −1, the phase offset value is adjusted, and 102 demodulating the in-phase and out-of-phase responses from the frequency of the time-switched frequency modulated accelerometer in an anti-phase vibrational mode is repeated and the slope is calculated 104 until the slope is equal to 1 or −1. However, if, after calculating the slope in 104, the slope is equal to 1 or −1, the initial phase offset value is kept as a selected phase offset value for the linear model.

Figure 3:
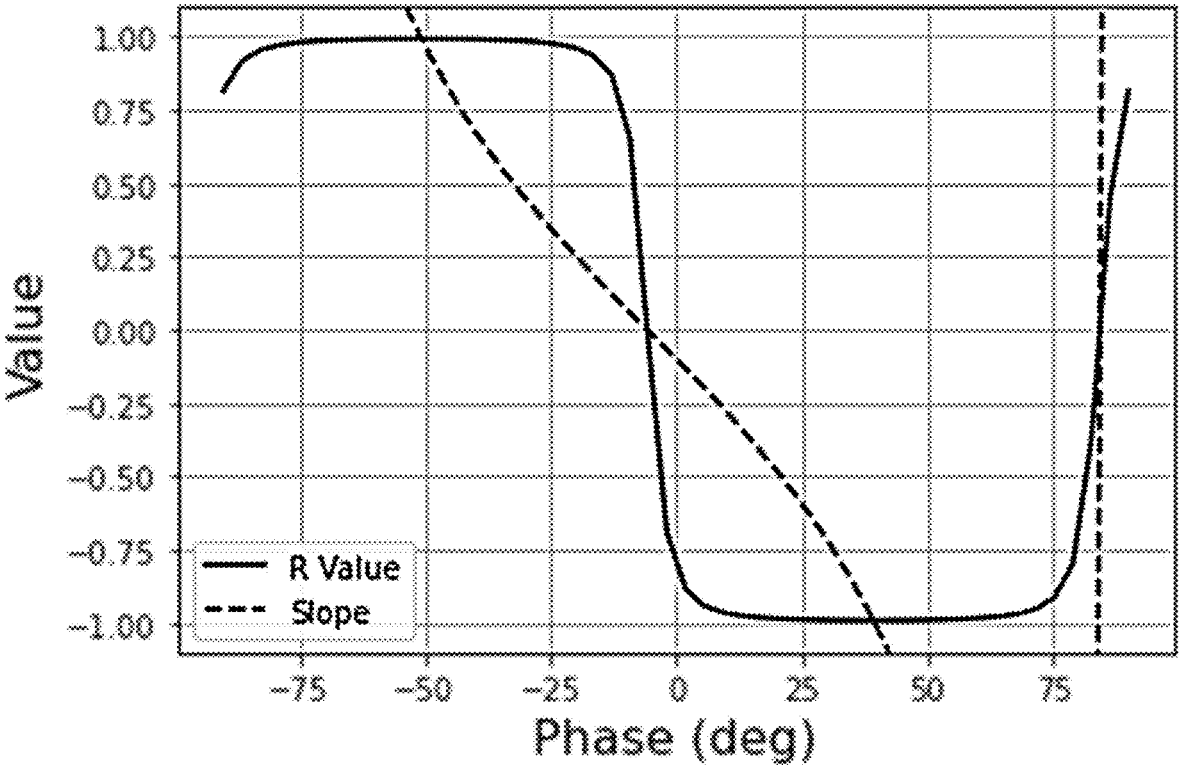
FIG. 3 is an example of a graph showing the R Value (Y-axis) vs. Phase (deg) (X-axis) of the correlation coefficient (R value) and slope between the in-phase and out-of-phase channels for different phase offset values.

In some examples, the method 100 further includes calculating a correlation coefficient to validate the slope between the in-phase response and the out-of-phase response after the slope of 1 or −1 has been calculated. The correlation coefficient can be calculated using the following equation (II):

$$m = r \frac{S_{IP}}{S_{OOP}} \tag{II}$$

where m is the slope, r is the correlation coefficient, $S_{IP}$ and $S_{OOP}$ are the uncorrected sample standard deviations of the in-phase and out-of-phase response. FIG. 3 shows an example of the correlation coefficient (R value) as a solid line where the magnitude is nearly 1 or −1 for most values of the phase offset. The correlation coefficient with a magnitude of 1 or −1 validates the correlation between the in-phase response and the out-of-phase response. In an example, a computer processor, an application-specific integrated circuit, a field programmable gate array, or a microcontroller may be used to calculate correlation coefficient to validate the slope between the in-phase channel and the out-of-phase channel.

Referring back to FIG. 1, the method 100 includes 108 using a linear model to detect bias drift with the out-of-phase response, thereby compensating for bias drift in the in-phase response of the time-switched frequency modulated accelerometer and maintaining stability in the time-switched frequency modulated accelerometer. The linear model is used to calculate the compensated in-phase response to compensate for bias drift of the time-switched frequency modulated accelerometer. The linear model is represented by equation (III):

$$IP_c = IP - m \times OOP \tag{III}$$

where $IP_c$ is a compensated in-phase response, IP is the in-phase response, m is the slope, and OOP is the out-of-phase response. An example of when the magnitude of the slope is about 1 is shown in FIG. 3 when the phase is about −50° or about 40°. In an example, a computer processor, an application-specific integrated circuit, a field programmable gate array, or a microcontroller may be used to calculate the compensated in-phase response. Using the compensated in-phase response of the time-switched frequency modulated accelerometer offsets bias drift in the time-switched frequency modulated accelerometer, which improves long-term (e.g., equal to or greater than 1 hour). stability.

Figure 4:
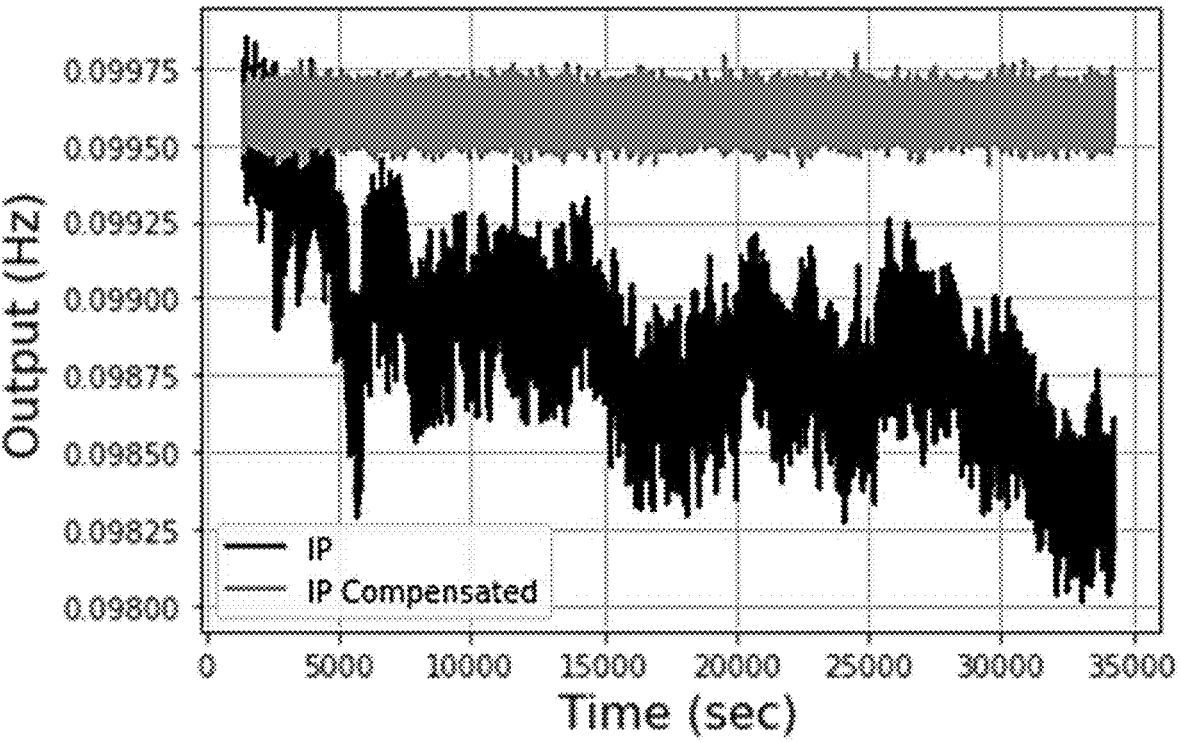
FIG. 4 is an example of a graph showing the uncalibrated Output (Hz) (Y-axis) vs. Time (sec) (X-axis) of the in-phase channel response to a −1 g input with the phase reference selected where the slope between the in-phase and out-of-phase channels is −1.

FIG. 4 shows an example between a standard in-phase response of a time-switched frequency modulated accelerometer in black and a compensated in-phase response of the same time-switched frequency modulated accelerometer in gray. The compensated in-phase response includes a −1 g input with the phase reference selected such that the slope between the in-phase and out-of-phase responses is −1. The compensated in-phase response used a linear model with the slope of −1. As shown in FIG. 4, the output with the selected phase offset when the slope has a value of −1 eliminated bias drift throughout the 35,000 seconds that the output was measured.

Figure 5:
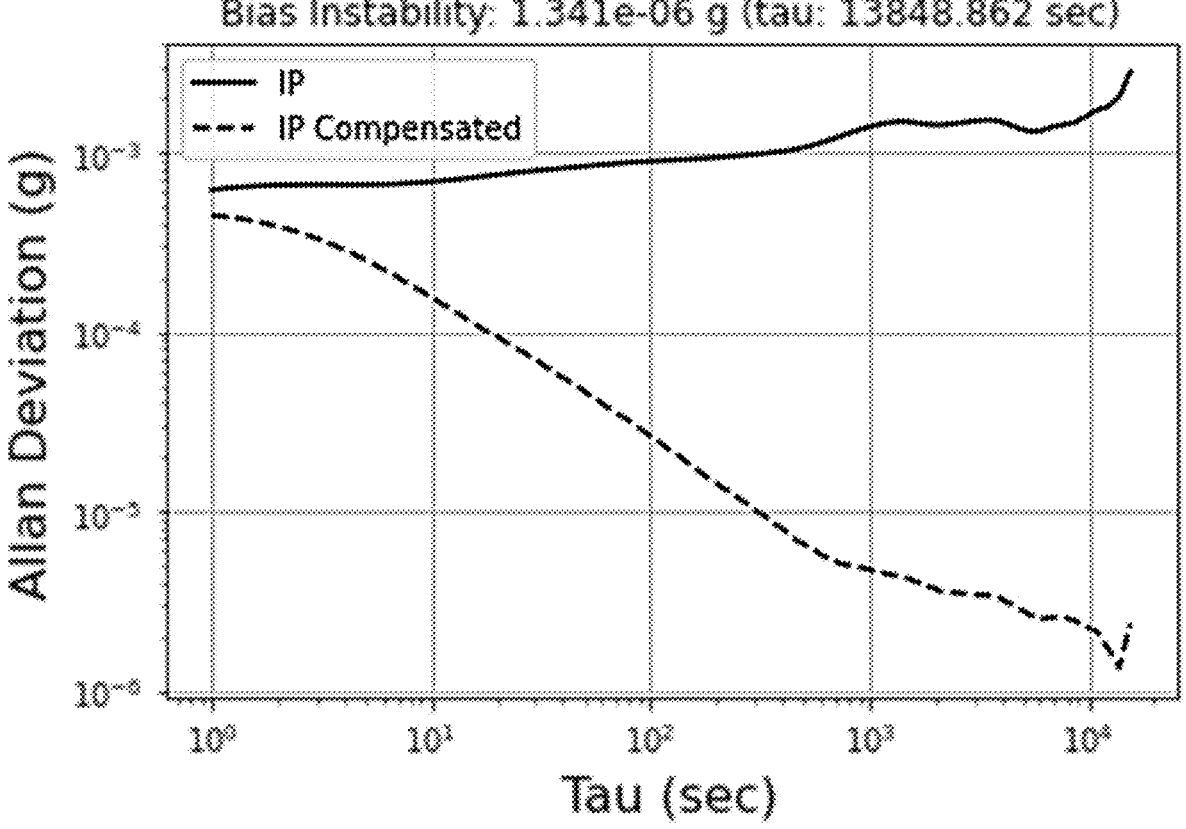
FIG. 5 is an example of a graph showing the Allen Deviation (g) (Y-axis) vs. Tau (sec) (X-axis) of the in-phase channel and in-phase channel compensated with the out-of-phase channel when set to measure −1 g.

FIG. 5 shows the in-phase response and in-phase compensated response using the Allen Deviation for the time-switched frequency modulated accelerometer. The Allen deviation quantifies various noise processes that affect the output of the time-switched frequency modulated accelerometer. Similar to FIG. 4, in FIG. 5 the uncompensated response (solid line) slowly drifts over time while the compensated in-phase response (dashed line) is Gaussian except at the shortest and longest average times.

Figure 6:
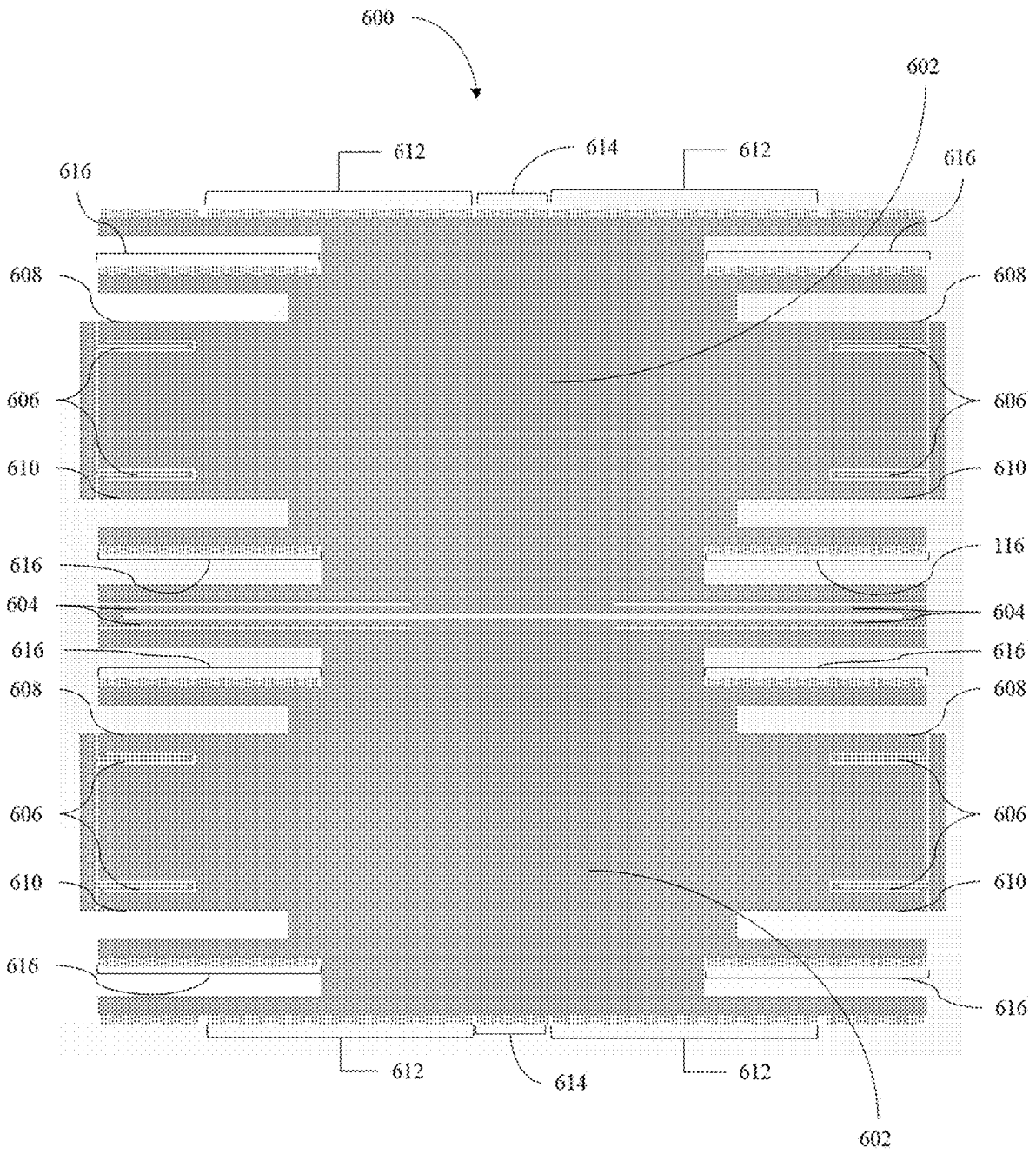
FIG. 6 is 2D schematic an example of a time-switched frequency modulated accelerometer in a static mode.

Referring now to FIG. 6, a 2D schematic an example of time-switched frequency modulated accelerometer as a single body multi-mode mechanical resonator 600 in static position is shown. FIG. 6 is for illustrative purposes only to aid in viewing and should not be construed as being limiting or directed to a particular material or materials. The time-switched frequency modulated accelerometer may be any type of time-switched frequency modulated accelerometer. In FIG. 6, the time-switched frequency modulated accelerometer is a single body multi-mode mechanical resonator 600. The single body multi-mode mechanical resonator 600 includes two or more spring-mass devices 602. Each spring-mass device 602 includes at least one lumped mass and one or more anchor springs 606. The example in FIG. 6 shows a single body multi-mode mechanical resonator 600 having eight anchor springs 606 total with four anchor springs 606 attached to each lumped mass of the spring mass device 602. In another example, one or more anchor springs 606 may be present in the single body multi-mode mechanical resonator 600. The anchor springs 606 attach the two or more lumped masses to a fixed substrate. In some examples, the fixed substrate may be any fixed substrate capable of being mounted to a chip carrier. An example of the fixed substrate is a silicon fixed substrate. The two or more spring mass devices 602 also have an in-phase mode and an anti-phase mode. This is discussed in detail below.

The spring-mass device 602 oscillates when the single body multi-mode mechanical resonator 600 is in use. The spring-mass devices 602 have a motion described with equations (IV) and (V):

$$M_1(x_1'' - x_{1Accel}'') = -K_1(x_1 - 0) - K_c(x_1 - x_2) - F_{1A} + F_{1B} \quad \text{(IV)}$$

$$M_2(x_2'' - x_{2Accel}'') = -K_2(x_2 - 0) - K_c(x_2 - x_1) - F_{2A} + F_{2B} \quad \text{(V)}$$

where $M_1$ is a lumped mass of a first mass, $M_2$ is a lumped mass of a second mass, $K_1$ is a first anchor spring stiffness, $K_2$ is a second anchor spring stiffness, $K_c$ is a coupling spring stiffness, $x_1$ is a displacement of the first mass, $x_2$ is a displacement of the second mass, $x''_1$ is an acceleration of the first mass, $x''_2$ is an acceleration of the second mass, $x''_{1Accel}$ is a proper acceleration of the first mass, $x''_{2Accel}$ is a proper acceleration of the second mass, $F_{1A}$ is a phase 1 electrostatic force applied to the first mass, $F_{1B}$ a phase 2 electrostatic force applied to the second mass, $F_{2A}$ is a phase 1 electrostatic force applied to the second mass, and $F_{2B}$ is a phase 2 electrostatic force applied to the first mass. The spring-mass devices 602 have two vibrational modes: an in-phase mode and an anti-phase mode. The in-phase mode is where $x_1 = x_2$ in equations (IV) and (V). The in-phase mode is sensitive to acceleration. Displacement of the in-phase mode due to acceleration gives rise to a frequency shift of the anti-phase mode. In an example, a frequency shift is designed to occur in a specific, known, or deterministic way. Based on the design of the single body multi-mode mechanical resonator 600 and the voltages applied to the phase 1 tuning electrodes electrode 608 and the phase 2 tuning electrodes electrode 610 (discussed in detail below), a deterministic shift in frequency occurs for a given acceleration. Once this relationship is determined using calibrated acceleration inputs, acceleration can be estimated.

Figure 7:
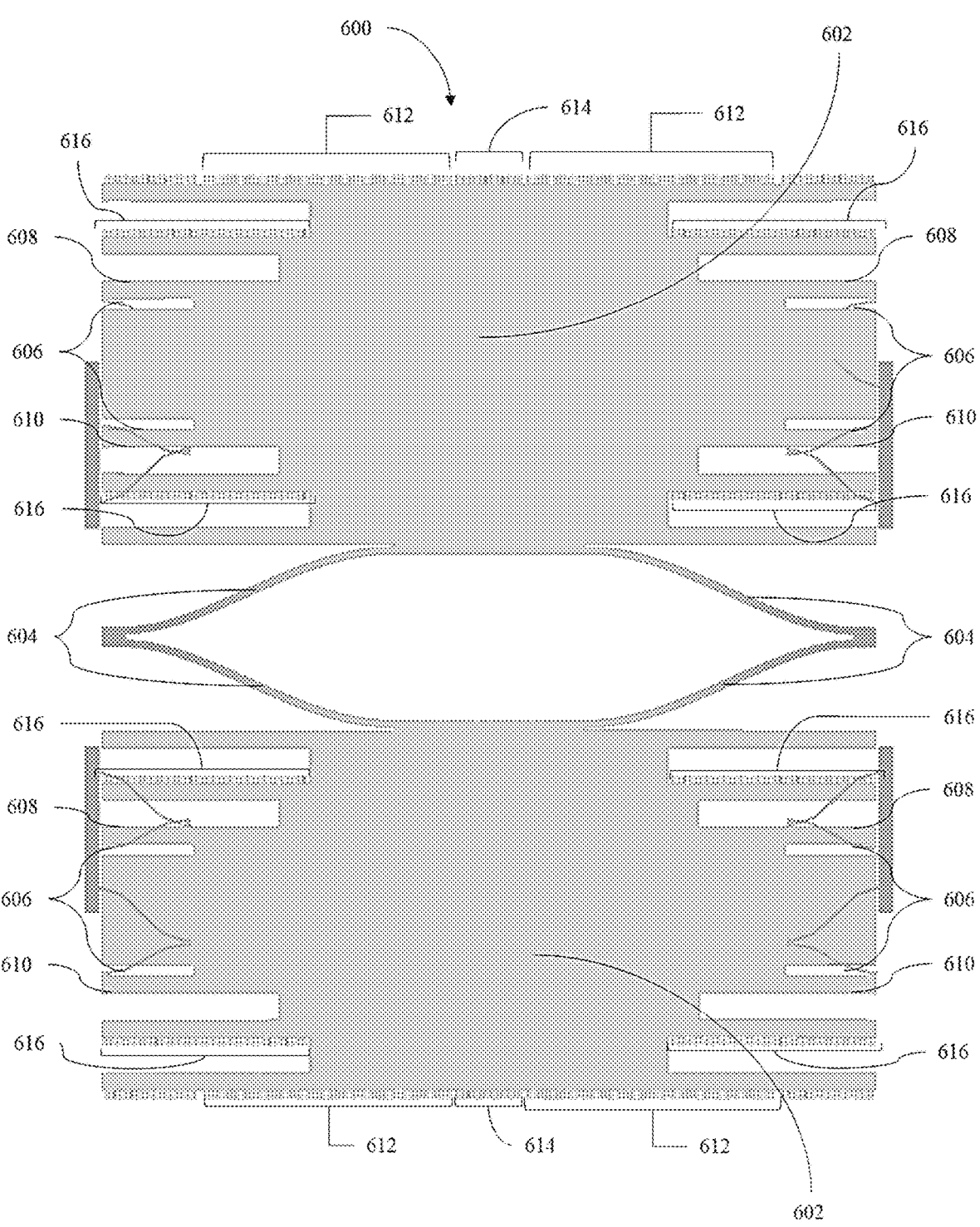
FIG. 7 is 2D schematic an example of a time-switched frequency modulated accelerometer in an anti-phase vibrational mode.

An example of the single body multi-mode mechanical resonator 600 operating in an anti-phase mode vibrational mode is shown in FIG. 7. The single body multi-mode mechanical resonator 600 in FIG. 7 is the same multi-mode resonator in FIG. 6, but the single body multi-mode mechanical resonator 600 is operating in an anti-phase vibrational mode. FIG. 7 is for illustrative purposes only to aid in viewing and should not be construed as being limiting or directed to a particular material or materials. The anti-phase vibrational mode is where $x_1 = -x_2$ in equations (IV) and (V). The anti-phase vibrational mode is operated in a closed-loop fashion that is self-excited.

Referring back to FIG. 6, the single body multi-mode mechanical resonator 600 includes one or more coupling springs 604. One or more coupling springs 604 are attached to each lumped mass as shown in FIG. 6 and FIG. 7. The coupling springs 604 couple a motion of the two or more lumped masses.

Referring back to FIG. 6, the single body multi-mode mechanical resonator 600 includes a phase 1 tuning electrodes electrode 608 and a phase 2 tuning electrodes electrode 610. The phase 1 tuning electrodes electrode 608 and the phase 2 tuning electrodes electrode 610 are attached to each lumped mass (i.e., each lumped mass has a phase 1 tuning electrodes electrode 608 and a phase 2 tuning electrodes electrode 610) as shown in FIG. 6 and FIG. 7. The phase 1 tuning electrodes electrode 608 and the phase 2 tuning electrodes electrode 610 apply forces to the in-phase mode that, in the presence of acceleration, yield equal in magnitude, but opposite in sign frequency shifts of the anti-phase mode. The anti-phase mode (i.e., f-mode) is insensitive to external acceleration and the in-phase mode (i.e., a-mode) is sensitive to acceleration. Anti-phase mode is operated in a positive feedback loop (output of the single body multi-mode mechanical resonator 600 is connected to input with a positive gain) such that electrodes 608, 610 amplitude is kept at a constant value. Displacement of the in-phase mode has the ability to modulate the stiffness of the anti-phase mode, and in turn, the frequency, of the anti-phase mode when operated as a single body multi-mode mechanical resonator via an electrostatic effect associated with the phase 1 and phase 2 tuning electrodes 608, 610. The stiffness of the anti-phase mode is derived from the anchor springs 606, the coupling springs 604, and the tuning electrodes 608, 610. As the multi-mode resonator gets closer to the tuning electrodes 608, 610 the frequency decreases. The opposite effect occurs as the multi-mode resonator moves away from the tuning electrodes 608, 610, the frequency increases. When the tuning electrodes 608, 610 are aligned to the in-phase mode (i.e., each electrode 608, 610 is active), for a given acceleration input, each give rise to equal in magnitude, but opposite in sign frequency shifts.

Referring back to FIG. 6, the single body multi-mode mechanical resonator 600 further includes a plurality of interdigitated shaped combs 612. The plurality of interdigitated shaped combs 612 is attached to each lumped mass as shown in FIG. 6 and FIG. 7. The plurality of interdigitated shaped combs 612 compensates for a frequency drift of the drive mode and cancels first-order displacement effects of the plurality of interdigitated shaped combs. In an example, frequency drift refers to undesirable effects, such as a change in frequency due to temperature variations. The profile of the plurality of interdigitated shaped combs 612 is designed such that the force produced is linearly related to the displacement. The plurality of interdigitated shaped combs 612 have a stationary finger and a moving finger that produce the force. The force between the stationary finger and the moving finger can be represented by the following equation (V):

$$F(x) = \epsilon_0 t \ V^2 / h(x) \qquad (VI)$$

where F(x) the amount of force generated between a pair of a stationary finger and a moving finger, $\epsilon_0$ is the permittivity of free space, t is the thickness of the stationary finger and a moving finger, V is the voltage difference between the stationary finger and moving finger, and h(x) is size of the gap between a stationary finger and a moving finger.

To generate a specific force (F(x)) between a pair of stationary and moving fingers, a gap between the stationary finger and the moving finger needs to be a specific shape or profile. In an example, one of the fingers is selected to have rectangular geometry and the other has a curved profile to generate the gap. Thus, to produce a force that is linear with respect to x, the size of the gap between the stationary finger and moving finger is represented by the following equation (VI):

$$h(x) = g_0 / (1 + x / x_{CL}) \qquad (VII)$$

where $g_0$ is the gap between a straight comb and the maximum distance between the straight comb and a curved comb and $x_{CL}$ is a dimensional constant. In the equation (VII), the straight comb is the stationary finger or moving finger and the curved comb is different from the straight comb and either the stationary finger or the moving finger. In an example, the movement distance of the moving fingers can be equal to or less than 10 microns. In another example, the movement distance can be adjusted based on the needs to reach a specific displacement for low noise operating and accuracy of the fabrication methods to match the gap profile described in equation (VII). In an example, the plurality of interdigitated shaped combs 612 may be present in any amount that compensates for slow frequency drifts. In some examples, the plurality of interdigitated shaped combs 612 is present in an amount of equal to or greater than 500 sets of the stationary finger and the moving finger.

Referring back to FIG. 6, the single body multi-mode mechanical resonator 600 also includes a plurality of interdigitated drive combs 614. The plurality of interdigitated drive combs 614 are attached to each lumped mass as shown in FIG. 6 and FIG. 7. The plurality of interdigitated drive combs 614 are aligned to the anti-phase mode that, with a frequency selective excitation, can excite the anti-phase mode with a low voltage when the single body multi-mode mechanical resonator 600 is operated within a low-pressure environment, which minimizes the effect of viscous damping. Frequency selective excitation refers to when the anti-phase mode exhibits resonance phenomena. The resonance phenomena has the largest displacement at specific resonant frequencies. Moreover, there are specific phase relationships between the input and output at these resonant frequencies such that a feedback system that compensates for the phase delay and damping can amplify oscillations at these frequencies subject to nonlinear effects. In an example, the low-pressure environment is equal to or less than 10 mTorr. In the example shown in FIG. 6, there is one set of a plurality of interdigitated drive combs 614 for each spring-mass device 602. In other examples, there are one or more sets of interdigitated drive combs 614 for each spring-mass device 602 where each set of interdigitated drive combs 614 includes a plurality of interdigitated drive combs.

Referring now to FIG. 6, the single body multi-mode mechanical resonator 600 includes a plurality of interdigitated sense combs 616 that are attached to each lumped mass as shown in FIG. 6 and FIG. 7. The plurality of interdigitated sense combs 616 are aligned to the anti-phase mode, are grounded when the single body multi-mode mechanical resonator 600 is polarized, and are capable of cancelling common-mode noise effects. The motion of the anti-phase mode induces a charge in one half of the plurality of interdigitated sense combs 616 that is equal in magnitude, but opposite in sign to the charge in the other one half of plurality of interdigitated sense combs 616 such that a differential measurement can cancel common-mode noise effects. Common-mode noise effects are noise effects shared between various nodes that are independent of the orientation or relative position of these nodes. An example of a common-mode noise effect is the noise that arises due to the bias voltage applied to the single body multi-mode mechanical resonator 600. In the example of the single body multi-mode mechanical resonator 600 in FIG. 6, each spring-mass device 602 has four sets of interdigitated sense combs 616 where each set of interdigitated sense combs 616 includes a plurality of interdigitated sense combs 616. In another example, each spring-mass device 602 has one or more sets of interdigitated sense combs 616 where each set of interdigitated sense combs 616 includes a plurality of interdigitated sense combs 616.

A system for improving long-term stability in a time-switched frequency modulated accelerometer is also disclosed herein. The system includes a time-switched frequency modulated accelerometer and an electronic device. A time-switched frequency modulated accelerometer may be the same time-switched frequency modulated accelerometer as previously disclosed herein. The electronic device demodulates a frequency of the time-switched frequency modulated accelerometer, calculates a slope, and uses a linear model with the out-of-phase response to compensate for bias drift of the in-phase response of the time-switched frequency modulated accelerometer. The electronic device may be any computer processor, an application-specific integrated circuit, a field programmable gate array, or a microcontroller able to demodulate a frequency of the time-switched frequency modulated accelerometer, calculate the slope, and use the linear model with the out-of-phase response to compensate for bias drift of the in-phase response of the time-switched frequency modulated accelerometer.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 1 to about 500 should be interpreted to include not only the explicitly recited limits of from about 1 to about 500, but also to include individual values, such as 30, 275, 355.5, etc., and sub-ranges, such as from about 50 to about 350, etc.

In describing and claiming the examples disclosed herein, the singular forms "a", "an", and "the" include plural referents unless the context clearly dictates otherwise.

What is claimed is:

1. A method for improving long-term stability in a time-switched frequency modulated accelerometer, comprising:

demodulating a frequency of the time-switched frequency modulated accelerometer in an anti-phase vibrational mode one or more instances, wherein assuming an initial phase offset value, demodulating occurs in-phase and out-of-phase with a modulation reference to extract in-phase responses and out-of-phase responses;

calculating a slope between the in-phase responses and the out-of-phase responses, wherein one of the following occurs:

i) if the slope is not equal to 1 or −1, the phase offset value is adjusted, and demodulating the in-phase and out-of-phase responses from the frequency of the time-switched frequency modulated accelerometer in an anti-phase vibrational mode is repeated and the slope is calculated until the slope is equal to 1 or −1; or ii) if the slope is equal to 1 or −1, keep the initial phase offset value as a selected phase offset value; and using a linear model to detect bias drift with the out-of-phase response, thereby compensating for the bias drift in the in-phase response of the time-switched frequency modulated accelerometer and a stability of the time-switched frequency modulated accelerometer is maintained.

2. The method of claim 1, wherein a computer processor, an application-specific integrated circuit, a field programmable gate array, or a microcontroller is used to demodulate the frequency of the time-switched frequency modulated accelerometer, calculate the slope, and use the linear model with the out-of-phase response to compensate for bias drift of the in-phase response.

3. The method of claim 1, wherein the slope is calculated using an equation (I):

$$m = \frac{\sum_{i=1}^{n}(IP_i - \overline{IP})(OOP_i - \overline{OOP})}{\sum_{i=1}^{n}(OOP_i - \overline{OOP})^2} \qquad (I)$$

where m is the slope, n is a total number of measurements of the in-phase response and the out-of-phase response, $IP_i$ is an i-th measurement of the in-phase response, $OOP_i$ is an i-th measurement of the out-of-phase response, $\overline{IP}$ is a mean value of the in-phase response, and $\overline{OOP}$ is a mean value of the out-of-phase response.

4. The method of claim 1, further including calculating a correlation coefficient to validate the slope between an in-phase channel and an out-of-phase channel.

5. The method of claim 4, wherein the correlation coefficient is calculated using equation (II):

$$m = r\frac{s_{IP}}{s_{OOP}} \qquad (II)$$

where m is the slope, r is the correlation coefficient, $s_{IP}$ is an uncorrected sample standard deviations of the in-phase response, and $s_{OOP}$ is an uncorrected sample standard deviations of the out-of-phase response.

6. The method of claim 4, wherein a computer processor, an application-specific integrated circuit, a field programmable gate array, or a microcontroller is used to calculate the correlation coefficient.

7. The method of claim 1, wherein the linear model is defined by equation (III):

$$IP_c = IP - m \times OOP \qquad (III)$$

where $IP_c$ is a compensated in-phase response, IP is the in-phase response, m is the slope, and OOP is the out-of-phase response.

8. The method of claim 1, wherein the time-switched frequency modulated accelerometer is a single-body multi-mode mechanical resonator including:

two or more spring mass devices, wherein the two or more spring mass devices include two or more lumped masses and one or more anchor springs where the one or more anchor springs attach the two or more lumped masses to a fixed substrate and the two or more spring mass devices have an anti-phase mode and an in-phase mode;

one or more coupling springs, wherein the one or more coupling springs are attached to each lumped mass and couple the motion of the two or more lumped masses;

one or more phase 1 tuning electrodes and one or more phase 2 tuning electrodes, wherein the one or more phase 1 tuning electrodes and the one or more phase 2 tuning electrodes are attached to each lumped mass and apply forces to the in-phase mode that yield equal in magnitude, but opposite in sign frequency shifts of the anti-phase mode;

a plurality of interdigitated shaped combs, wherein the plurality of interdigitated shaped combs is attached to each lumped mass and compensates for a frequency drift of the anti-phase mode and cancels first-order displacement effects of the plurality of interdigitated shaped combs;

a plurality of interdigitated drive combs, wherein the plurality of interdigitated drive combs are attached to each lumped mass and are aligned to the anti-phase mode, with a frequency selective excitation, can excite the anti-phase mode with a low voltage when the multi-mode mechanical resonator is operated within a low-pressure environment;

a plurality of interdigitated sense combs, wherein the plurality of interdigitated sense combs are attached to each lumped mass and are aligned to the anti-phase mode, are grounded when the multi-mode mechanical resonator is polarized, and are capable of cancelling common-mode noise effects.

9. The method of claim 8, wherein the two or more spring-mass devices have a motion described with equations (IV) and (V):

$$M_1(x_1'' - x_{1Accel}'') = -K_1(x_1 - 0) - K_c(x_1 - x_2) - F_{1A} + F_{1B} \qquad \text{(IV)}$$

$$M_2(x_2'' - x_{2Accel}'') = -K_2(x_2 - 0) - K_c(x_2 - x_1) - F_{2A} + F_{2B} \qquad \text{(V)}$$

where $M_1$ is a lumped mass of a first mass, $M_2$ is a lumped mass of a second mass, $K_1$ is a first anchor spring stiffness, $K_2$ is a second anchor spring stiffness, $K_c$ is a coupling spring stiffness, $x_1$ is a displacement of the first mass, $x_2$ is a displacement of the second mass, $x''1$ is an acceleration of the first mass, $x''2$ is an acceleration of the second mass, $x''_{1Accel}$ is a proper acceleration of the first mass, $x''_{2Accel}$ is a proper acceleration of the second mass, $F_{1A}$ is a phase 1 electrostatic force applied to the first mass, $F_{1B}$ a phase 2 electrostatic force applied to the second mass, $F_{2A}$ is a phase 1 electrostatic force applied to the second mass, and $F_{2B}$ is a phase 2 electrostatic force applied to the first mass.

10. The method of claim 8, wherein a moving finger and a stationary finger have a gap between the stationary finger and the moving finger represented by an equation (VI):

$$h(x) = g_0/(1 + x/x_{CL}) \qquad \text{(VI)}$$

where $g_0$ is the gap between a straight comb and the maximum distance between the straight comb and a curved comb and $x_{CL}$ is a dimensional constant wherein the straight comb is the stationary finger or moving finger and the curved comb is different than the straight comb and either the stationary finger or the moving finger.

11. A system for improving long-term stability in a time-switched frequency modulated accelerometer, comprising:

the time-switched frequency modulated accelerometer; and an electronic device, wherein the electronic device demodulates a frequency of the time-switched frequency modulated accelerometer, calculates a slope, and uses a linear model with an out-of-phase response to compensate for bias drift of an in-phase response of the time-switched frequency modulated accelerometer;

wherein the time-switched frequency modulated accelerometer is a single-body multi-mode mechanical resonator including:

two or more spring mass devices, wherein the two or more spring mass devices include two or more lumped masses and one or more anchor springs where the one or more anchor springs attach the two or more lumped masses to a fixed substrate and the two or more spring mass devices have an anti-phase mode and an in-phase mode;

one or more coupling springs, wherein the one or more coupling springs are attached to each lumped mass and couple the motion of the two or more lumped masses;

one or more phase 1 tuning electrodes and one or more phase 2 tuning electrodes, wherein the one or more phase 1 tuning electrodes and the one or more phase 2 tuning electrodes are attached to each lumped mass and apply forces to the in-phase mode that yield equal in magnitude, but opposite in sign frequency shifts of the anti-phase mode;

a plurality of interdigitated shaped combs, wherein the plurality of interdigitated shaped combs is attached to each lumped mass and compensates for a frequency drift of the anti-phase mode and cancels first-order displacement effects of the plurality of interdigitated shaped combs;

a plurality of interdigitated drive combs, wherein the plurality of interdigitated drive combs are attached to each lumped mass and are aligned to the anti-phase mode, with a frequency selective excitation, can excite the anti-phase mode with a low voltage when the multi-mode mechanical resonator is operated within a low-pressure environment;

a plurality of interdigitated sense combs, wherein the plurality of interdigitated sense combs are attached to each lumped mass and are aligned to the anti-phase mode, are grounded when the multi-mode mechanical resonator is polarized, and are capable of cancelling common-mode noise effects.

12. The system of claim 11, wherein the two or more spring-mass devices have a motion described with equations (III) and (IV):

$$M_1(x_1'' - x_{1Accel}'') = -K_1(x_1 - 0) - K_c(x_1 - x_2) - F_{1A} + F_{1B} \qquad \text{(IV)}$$

$$M_2(x_2'' - x_{2Accel}'') = -K_2(x_2 - 0) - K_c(x_2 - x_1) - F_{2A} + F_{2B} \qquad \text{(V)}$$

where $M_1$ is a lumped mass of a first mass, $M_2$ is a lumped mass of a second mass, $K_1$ is a first anchor spring stiffness, $K_2$ is a second anchor spring stiffness, $K_c$ is a coupling spring stiffness, $x_1$ is a displacement of the first mass, $x_2$ is a displacement of the second mass, $x''_1$ is an acceleration of the first mass, $x''_2$ is an acceleration of the second mass, $x''_{1Accel}$ is a proper acceleration of the first mass, $x''_{2Accel}$ is a proper acceleration of the second mass, $F_{1A}$ is a phase 1 electrostatic force applied to the first mass, $F_{1B}$ a phase 2 electrostatic force applied to the second mass, $F_{2A}$ is a phase 1 electrostatic force applied to the second mass, and $F_{2B}$ is a phase 2 electrostatic force applied to the first mass.

13. The system of claim 11, wherein a moving finger and a stationary finger have a gap between the stationary finger and the moving finger represented by an equation (V):

$$h(x) = g_0/(1 + x/x_{CL}) \qquad \text{(VI)}$$

where $g_0$ is the gap between a straight comb and the maximum distance between the straight comb and a curved comb and $x_{CL}$ is a dimensional constant wherein the straight comb is the stationary finger or moving finger and the curved comb is different than the straight comb and either the stationary finger or the moving finger.

* * * * *